United States Patent [19]

Singhi et al.

[11] 3,819,870

[45] June 25, 1974

[54] PRIVATE AUTOMATIC TELEPHONE SYSTEM

[75] Inventors: Dilip T. Singhi, Chicago; Richrd J. Medal, Mt. Prospect, both of Ill.

[73] Assignee: Rauland-Borg Corporation, Chicago, Ill.

[22] Filed: Sept. 28, 1972

[21] Appl. No.: 292,957

[52] U.S. Cl. .................................................. 179/26
[51] Int. Cl. .............................................. H04m 3/60
[58] Field of Search......... 179/18 BB, 18 DA, 18 D, 179/26, 27 FC, 27 DB, 27 FF

[56] References Cited

UNITED STATES PATENTS 1,927,531 9/1933 Stonebridge .................... 179/18 BB
2,261,243 11/1941 Flint ................................ 179/27 FF

*Primary Examiner*—William C. Cooper
*Attorney, Agent, or Firm*—Wolfe, Hubbard, Leydig, Voit & Osann, Ltd.

[57] ABSTRACT

Improvements in a private automatic telephone system for use in schools and other locations where supervisory control over the use of certain telephones is desired, the system including both dial and dialless telephones. The improvements comprise a display unit associated with preselected dial telephones which sequentially produces a digital visual readout of telephone numbers of dialless telephones which have gone off-hook and which have not been responded to by being called by a party at a dial telephone. Provision is also made for single button dialing of such dialless telephones by dialing a single digit which automatically connects the dial telephone to one of the unresponded to dialless telephones even though the dialless telephone may have a three or more digit telephone number. In the event the dial telephone has the digital readout feature, the party at the dial telephone may call the unresponded to dialless telephones in any desired order by merely waiting until the visual indication of the desired telephone number appears, lifting the receiver off-hook and dialing the single digit to connect the two telephones. Once the telephones are connected, the remaining dialless telephones which have not been responded to will continue to be sequenced in the digital display.

16 Claims, 9 Drawing Figures

PRIVATE AUTOMATIC TELEPHONE SYSTEM

CROSS REFERENCE TO RELATED APPLICATIONS

James E. Dahlquist and Richard J. Medal, Ser. No. 240,122, filed Mar. 31, 1972, for A Private Automatic Telephone System.

BACKGROUND OF THE INVENTION

This invention relates generally to telephony and, more particularly, relates to improvements in a private automatic telephone system particularly adapted for use in buildings, such as schools or the like, where administrative control over the use of certain telephones is desired. More specifically, the invention relates to electrical circuitry that is adapted to provide single digit dialing of a telephone number in the system and also provide a visual digital readout of certain telephone numbers, with the visual digital readout preferably being located on one or more of the dial telephones.

Reference is made to the above cross referenced application of Dahlquist and Medal which comprehensively describes a private automatic telephone system that provides supervisory control over the use of the telephone system if desired. As mentioned therein, private telephone systems have long been used in schools or the like, but often require a switchboard or switchboard operator to make the desired connections between various telephones, with an off-hook telephone lighting an indicator lamp which seen by the operator who makes a connection to answer the call. One disadvantage of such systems is that all telephone connections must be made with the assistance of the switchboard operator which, of course, means that the speed in which calls may be placed and completed is determined by the proficiency of the switchboard operator.

Conversely, while fully automatic private telephone systems are not limited in the sense that a switchboard operator is required for the completion of calls, such automatic systems also have the inherent disadvantage in that calls may be made between telephones without administrative or supervisory control. In school classrooms, for example, it is often desirable to have control over telephone conversations between parties, and particularly students in different classrooms to preclude unnecessary use of the telephone system for personal reasons. One relatively unsatisfactory way to preclude initiation of calls from a classroom is to provide dialless telephones in them, but in a fully automatic system, it would be impossible to initiate a call from such locations. It is also desirable that a telephone system have the capability of handling several independent telephone calls simultaneously, particularly if the telephone system is used in a large installation having many telephones and substantial telephone traffic.

Briefly stated, the private automatic telephone system cross referenced above is adapted to include up to 999 telephones which may be predominately of the dial or dialless type. The location of a telephone typically dictates whether it should be a dial or dialless telephone. If the system is installed in a school, for example, dialless telephones are generally placed in the classrooms and standard push button dial telephones are placed in the administrative office areas, as well as other locations where supervisory control over the initiation of calls would be unnecessary. The system is adapted to provide automatic operation in the sense that any dial telephone may be used to dial any other telephone in the system by raising the receiver to receive the dial tone, enabling a person to push button dial a three digit number of the desired recipient telephone which causes ringing in that telephone or a busy signal if the recipient telephone is busy. Thus, calls may be completed from any dial telephone automatically using the procedure that is quite similar to most public telephone systems.

Supervisory or administrative control over the dialless telephones is provided in that calls initiated from such dialless telephones may not be completed without being at least tacitly cleared or authorized by an administrator since such calls must go through an administrative dial telephone. An administrator responding to an off-hook unanswered dialless telephone may determine who is initiating a call, what the purpose of the call is, as well as the location of the requested recipient telephone before the administrative person "transfers" the call to the requested recipient telephone. Thus, it is possible for an administrative person to screen unauthorized calls between classrooms.

The system includes a call annunciator which may include an associated light panel having a numbered light corresponding to the telephone number of the telephones within the system. The annunciator light panel is adapted to provide a distinct visual indication for any telephone that is engaged in a telephone call, or in the case of a dialless telephone being off-hook or previously off-hook and unanswered, a visual indication such as a full brightness illumination may be provided whereas a busy telephone may be a flashing indication. The annunciator light panel is typically located in an administrative area having one or more dial telephones.

To initiate a telephone call from a dialless telephone, and assuming the system includes an annunciator with an associated light panel, the receiver is merely taken off-hook which is effective to provide a full brightness visual indication of the number of the off-hook telephone in the annunciator light panel. The calling party may either keep the dialless telephone off-hook or replace the receiver if desired. The full brightness indication on the annunciator light panel will remain until the dialless telephone initiating the call is responded to by being called by a dial telephone.

To respond to the dialless telephone initiating the call, any of the personnel having a dial telephone seeing the visual indication on the annunciator light panel may pick up their receiver and dial the number associated with the dialless telephone to establish a two way telephone call. If the administrative person responding to the call is not the person to which the party at the dialless telephone wishes to talk to, the administrative person may connect the dial telephone to any other nonbusy telephone in the system and thereafter disconnect himself from the conversation. There are, of course, many other features described in the above cross referenced telephone system, and reference is made thereto for a detailed description of the circuitry as well as the nature of its operation.

DESCRIPTION OF THE INVENTION

Although the annunciator light panel may be located in an area where several administrative people are located and is therefore adapted to provide a visual indication of the telephone numbers of dialless telephones which have previously been taken off-hook and are unresponded to, as well as provide a different visual indication of dialless telephones which are busy in a telephone conversation, it is also quite possible that a single dial telephone in an administrative area may have a responsibility for responding to calls initiated by dialless telephones. If only one administrative person is primarily responsible for responding to such dialless telephones, it may be unnecessary to have the associated annunciator light panel located nearby. It is also conceivable that an administrative person may be the sole occupant of an office and have back-up responsibility for responding to dialless telephones. If the annunciator light panel is located in a larger room wherein several administrative personnel may effectively use it and the administrative person having the back-up responsibility is unable to view the annunciator light panel, it should be understood that either a second annunciator light panel or some other means for providing an indication of unresponded to dialless telephones attempting to initiate a call would be required.

Accordingly, it is an object of the present invention to provide a relatively small visual digital display unit that illuminates the telephone number of an unresponded to dialless telephone so that an administrative person seeing the indication may see the telephone number and respond to the dialless telephone.

Another object of the present invention is to provide the visual digital display unit within the dial telephone itself and thereby provide a neat and compact display which requires no space other than the space required by the telephone itself.

Yet another object of the present invention is to provide such a visual digital display unit which automatically sequences the telephone numbers of several unresponded to dialless telephones, thereby indicating the number of such unresponded to dialless telephones, as well as the identity or telephone number of each of them.

Still another object of the present invention lies in the provision of enabling the party at the telephone having a digital readout unit to permit the telephone numbers of the unresponded to dialless telephones automatically sequence and thereafter stop the sequencing when the receiver is taken off-hook. A related object lies in the provision for resuming the sequencing of unresponded to dialless telephones after the connection between the dial telephone and the responded to telephone is completed.

Another object of the present invention lies in the provision for responding to a dialless telephone by dialing a single digit, even though all telephones within the system have a three digit number, by merely taking the dial telephone receiver off-hook when the desired telephone number is being displayed and depressing a single button which automatically connects the dial telephone to the dialless telephone.

A more detailed object of the present invention lies in the provision for blocking out the single digit dialing feature in the event the predetermined digit is not dialed, thus enabling the dial telephone to immediately call any desired telephone by dialing the appropriate three digit number.

Other objects and advantages will become apparent from reading the following detailed description in conjunction with the attached drawings, in which.

While the present invention will be described in connection with certain preferred embodiments, it should be understood that it is not intended to limit the invention to these particular embodiments. On the contrary, it is intended to cover all alternatives, modifications and equivalents as may be included within the spirit and scope of the invention as expressed in the appended claims. In this connection, it is noted that exemplary circuit diagrams for various modules of the system are shown in detail in the specification and drawings. It should be understood that one skilled in the art could substitute different circuitry to produce the desired output information, giben similar input information and the invention is intended to encompass such alternative circuitry as may be included within the spirit and scope of the invention.

As used herein, the term signal is to be taken in a generic sense and is intended to include any electrical manifestation having information content. Additionally, since the present invention is generally related to the art of telephony, it should be understood that certain words and phrases used herein are meant to convey information concerning the use and operable condition of telephones within the system. For example, an "on-hook" telephone is intended to indicate that its hook switch is depressed as would occur when the receiver of the telephone is resting in its cradle. Similarly, an "off-hook" telephone is one in which the hook switch of the telephone is extended as would occur when the receiver is lifted from its hook or cradle. A completed telephone "call" is intended to mean that two or more telephones within the system are connected to permit voice communication between them.

Figure 1:
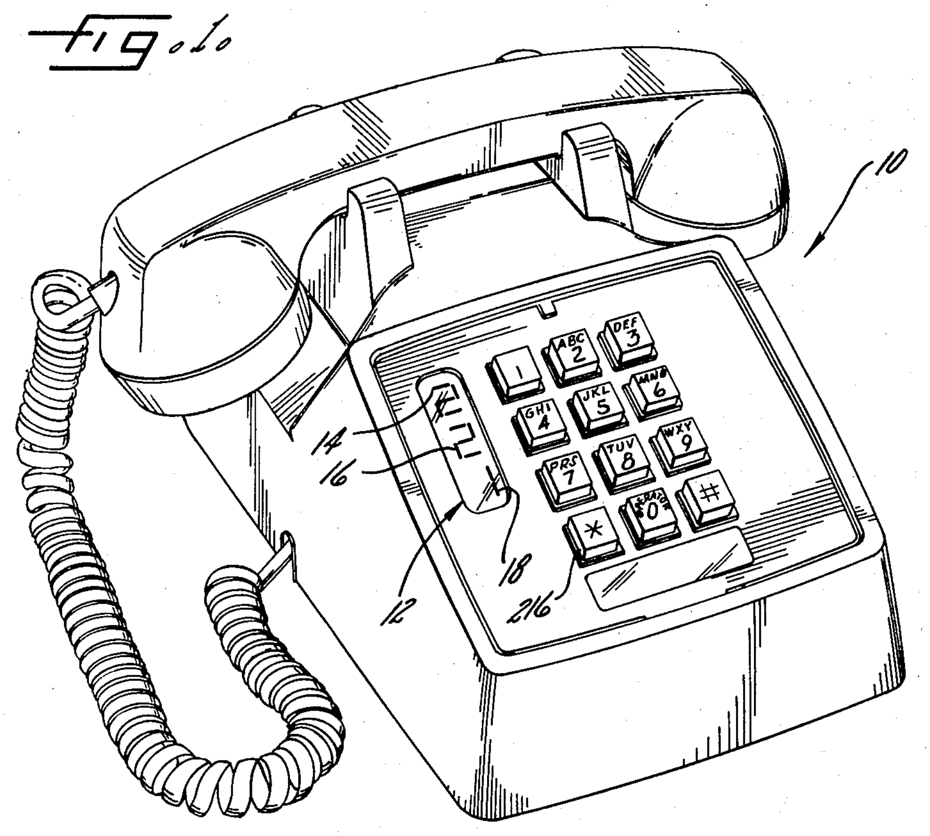
FIG. 1 is a perspective view of a telephone which includes a visual digital display unit incorporated therein embodying the present invention.
Figure 2:
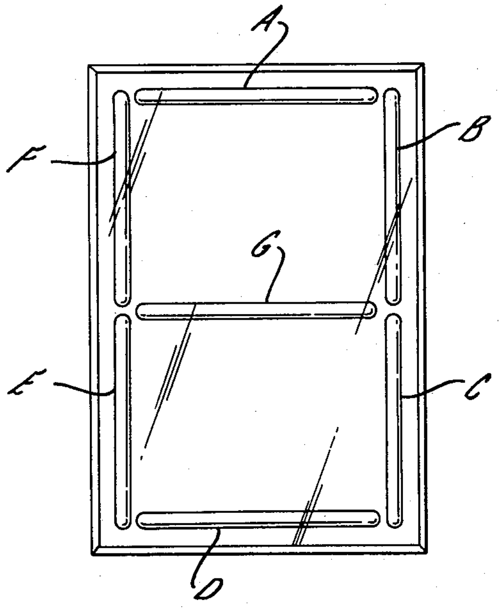
FIG. 2 is an enlarged plan view of a portion of the visual digital diaplay unit that is incorporated in the telephone shown in FIG. 1.

Turning now to the drawings and particularly to FIGS. 1 and 2, a telephone 10 is shown having a visual digital readout unit, indicated generally at 12, incorporated therein which comprises three lamps, 14, 16 and 18, each of which are adapted to visually illustrate any of the integers by selectively illuminating predetermined filaments within the lamp. It should be understood that while there are only three of such lamps shown in FIG. 1, the number of lamps could be a greater or lesser number depending upon the capability of the telephone system. Since the circuitry associated with the above cross-referenced telephone system is particularly adapted for using three digit telephone numbers, the digital display unit 12 contains a total of three such lamps since three lamps are sufficient to indicate any of the telephone numbers within the system. For purposes of illustration, the telephone number 221 is indicated in the diaplay of FIG. 1 which is accomplished by selectively illuminating preselected filaments within each of the lamps, it being obvious that the top lamp is intended to indicate the integer of the hundred column, the middle lamp the tens column and the lower lamp the units column. As is schematically illustrated in FIG. 2, each of the lamps contain a total of seven filaments, designated as A through G, which are selectively illuminated to define any of the integers. For example, the formation of the number 8 would require all filaments to be illuminated, the number 2 as is shown in the hundreds lamp 14 would require illumination of filaments A, B, G, E and D. The other integers may similarly be easily produced by selectively eliminating the appropriate filaments.

Figure 3:
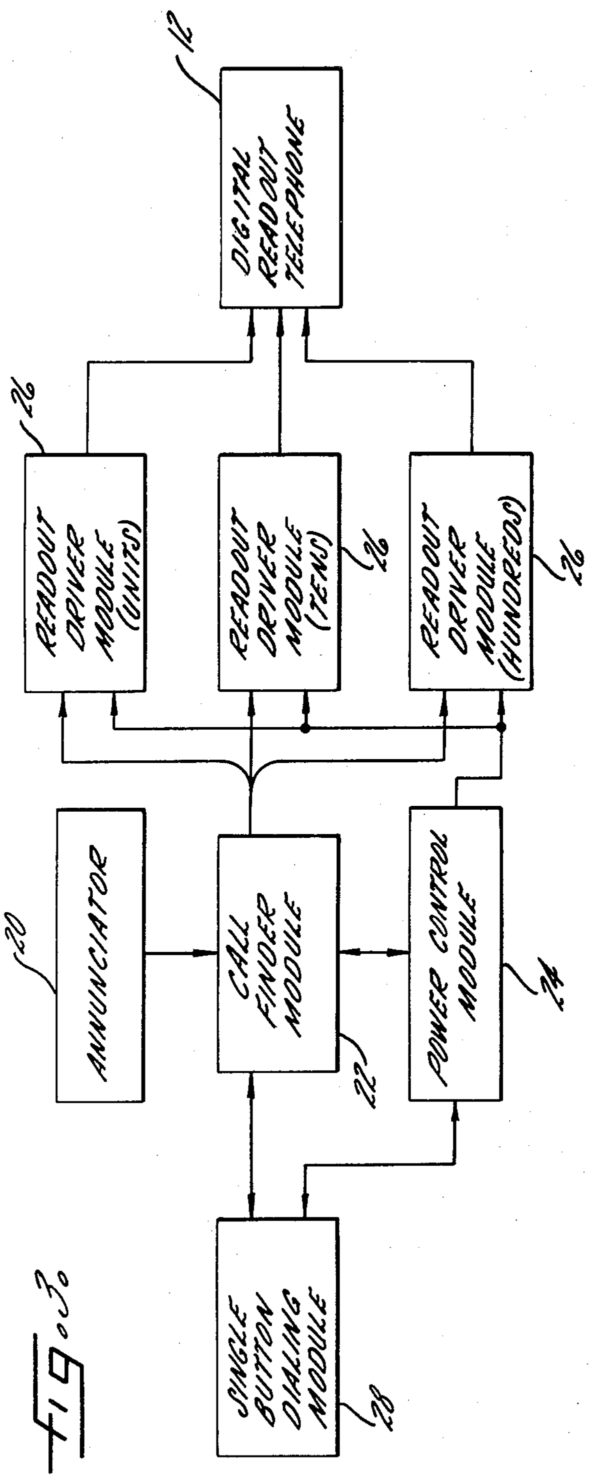
FIG. 3 is a schematic block diagram of major modules embodying the present invention.
Figure 4:
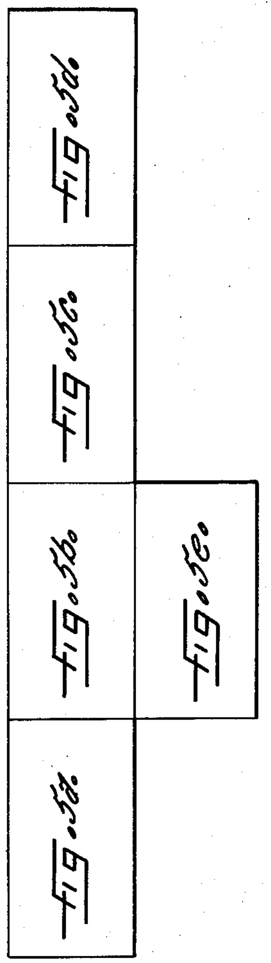
FIG. 4 is a chart indicating how the several FIGS. *5a-5e* are to be joined together to form a composite FIG. 5; and FIGS. *5a-5e*, when joined as indicated in FIG. 4, constitute a substantially complete circuit diagram of the major modules which together represent an exemplary embodiment of the present invention, with certain redundant modules being omitted.

Turning now to FIG. 3, there is shown a schematic block diagram which ilustrates the various modules embodying the present invention which are also shown in detail FIGS. *5a-5e*. Broadly stated, an annunciator 20 contains a circuit associated with each of the dialless telephones within the system and supplies a steady positive voltage output responsive to a dialless telephone going off-hook. It is this positive voltage that is connected to an annunciator light panel in the event a light panel is provided. With respect to the present invention, the positive voltage is also applied to a call finder module 22 which automatically sequentially searches individual circuits corresponding to the circuits in the annunciator to determine the existence or presence of positive voltage indicating that dialless telephones have gone off-hook. Thus, there is a circuit in the call finder module associated with each of the dialless telephones. The sequential searching of the individual circuits is performed in response to a driving signal supplied by a power control module 24. The power control module supplies a pulsing driving signal to the call finder module which causes it to individually search all of the circuits to find the existence of a positive voltage applied in any one or more of them. Additionally, once the call finder has sequenced through all of the circuits, the power control module automatically recycles the call finder to resume searching from the beginning. Once the existence of an applied positive voltage is determined, the driving signal automatically stops until the power control module restarts the pulsing signal within a predetermined time. Moreover, when the call finder module does determine the presence of an applied positive voltage in one of the circuits, the power control module provides a positive output voltage to each of three readout driver modules 26 which enables the visual digital readout unit to be illuminated. The power control module 24 also contains circuitry for determining an overcurrent or overvoltage condition and thereby protects the lamps in the digital readout unit. Provision is also made in the power control module for disabling the restart of the driving signal in the event a dial telephone is taken off-hook and has the effect of freezing a telephone number in the digital readout unit so that the dial telephone may utilize a single digit dialing feature previously referred to. A single dialing module 28 is adapted to connect a telephone being dialed to an unresponded to dialless telephone responsive to the dialing of a single digit, once the module is enabled which occurs when it receives an enabling signal from the call finder module. The register control equipment for the telephone system is connected to the single digit dialing module, as are each of the the circuits of the call finder module 22. Thus, if a positive voltage is received by the call finder module in one of the circuits indicating that a dialless telephone has gone off-hook and the call finder module finds or determines the existence of such positive voltage, the interconnection of that circuit with the single digit dialing module identifies the dialless telephone and responsive to an enabling signal being received by the single digit dialing module together with dialing of the single digit will provide the coding information to the system for connecting the two telephones together.

Each of the individual circuits in the call finder module is also connected to each of the three digital readout driver modules 26, one being provided for the hundreds, tens and units lamp in the digital readout unit 12. Each of the driver modules is interconnected with the circuit in the call finder module to light the appropriate filaments in the lamps, in the event an output voltage is supplied from the power control module 24.

Turning now to the detailed circuitry of FIGS. *5a-5e*, and particularly FIG. *5b* input terminals 30, 32 and 34 are illustrated and are connected to respective circuits in the annunciator panel 20 which are associated with individual dialless telephones in the telephone system. It should be appreciated that if there are 25 dialless telephones in the telepone system, the call finder module 22 will be provided with 25 input terminals. As is shown in FIG. *5b*, only three input terminals and associated circuitry are illustrated. As previously mentioned, when a dialless telephone is taken off-hook, a positive voltage is applied at one of the input terminals, for example terminal 30. Thus, if positive voltage is applied at terminal 30, a transistor 36 turns on, which in turn turns on a transistor 38 through a path defined by resistor 40, line 42 and resistor 44. The collector of transistor 36 is also connected to a stop driver output line 46 through diodes 48 and 50, and both of these diodes are also connected to a diode 52 and resistor 54, with the diode 52 being connected to the anode of a silicone controlled rectifier (SCR) 56.

To sequence through the various circuits to determine which, if any, have a positive voltage applied at the various terminals 30, 32 and 34, and assuming that a driving signal, preferably comprising a series of low voltage pulses, is applied through line 58 from the power control module 24, it will be seen that the pulses will be simultaneously applied to each of the diodes 60, 62 and 64 of the individual circuits. The diode 60, for example, has its cathode connected to the anode of SCR 56 as well as to a capacitor 66 which is in turn connected through resistor 68 to the gate of SCR 70 associated with the adjacent circuit. Assuming that a positive voltage is applied through line 72 from the power control module to the gate of SCR 56, it will be triggered to conduct until the next negative pulse is applied in line 58. By virtue of SCR 56 conducting, the charge accumulated in capacitor 66 is quickly dissipated so that when the driving signal again goes high, the charge will be passed to the gate and will trigger on SCR 70. Capacitor 66 is typical of similarly positioned capacitors associated with the other SCR's in the circuits and becomes fully charged by the application of the driving signal and does not take on any new charge and therefore does not turn on the next SCR until the adjacent SCR is triggered into conduction enabling the capacitor to discharge and is thereafter available to pass the positive going portion of the pulse and trigger the next adjacent SCR on. In this way, the SCR's are sequentially turned on and off until a final SCR 74 is turned on, in which case the power control module 24 recycles the call finder module by again applying a positive pulse in line 72 triggering on the initial SCR 56.

Assuming that a positive voltage is applied at terminal 30 at the same time that SCR 56 is conducting, it should be understood that a positive voltage will be produced in line 76, 78 and 80 through line 82 and the illustrated diodes 84, 86 and 88. These lines are connected to appropriate terminals in each of the readout driver modules 26 so that three numbers will be illuminated in the visual digital readout unit. Accordingly, the lines 76, 78 and 80 are connected to identify an integer, respectively, in the hundreds, tens and units column corresponding to the telephone number of the telephone to which the circuit having input terminal 30 is associated. If positive voltage is applied at terminal 30, then transistor 36 is turned on and if SCR 56 is simultaneously conducting, a low voltage will appear in line 46 which is effective to terminate the driving signal being generated by the power control module 24 as will hereinafter be described. Thus, SCR 56 will remain conducting until the restart of the driving signal and positive voltage will be present in lines 76, 78 and 80. The telephone number associated with the circuit will remain illuminated in the digital readout unit until the driving signal is restarted. As previously mentioned, the turning on of transistor 36 also turns on transistor 38 which results in a positive voltage being produced in line 90 which is connected to the single digit dialing module and provides an enabling signal which will permit single digit dialing if desired. Conversely, the lack of a high voltage in line 90 will preclude single digit dialing. It should also be realized that line 92, which is connected to the power control module is also connected through resistors 95, 97 and 99 to the respective SCR's 56, 70 and 74 and thus senses any current flowing through any SCR's. As will be hereinafter described, if any of the SCR's are conducting, current will be present in line 92 and sequencing will continue. Once all of the SCR's are turned off, current will not be present in line 92 and this coupled with the positive going portion of the next successive pulse of the driving signal being applied to line 94 will cause the power control module to apply a positive voltage in line 72 which initiates the recycling of the call finder to turn on SCR 56.

Turning now to the power control module 24 shown in FIG. 5*e*, a positive supply voltage is applied to terminal 100 which maintains transistors 102 and 104 in a normally on condition. To generate the driving signal comprised of negative or low voltage pulses, a unijunction transistor 106 has its emitter connected to the supply voltage 100 by means of a potentiometer 108 and resistors 110. A capacitor 112 is adapted to be charged and cause unijunction transistor 106 to fire, preferably every 4.5 milliseconds, although the frequencies may be changed by varying the setting of the potentiometer 108. When unijunction 106 fires, transistor 104 turns off momentarily causing transistor 102 to also turn off thereby producing a series of low voltage pulses at terminal 114 to which line 58 is connected, providing the driving signal for the call finder module.

To recycle the call finder module 22 after all SCR's have been switched off, a transistor 116 is provided to remain on as long as any of the SCR's in the call finder module or a SCR 122 in the power control module are on, but which turns off when none of thse SCR's are on. Thus when SCR 74 is shut off the next positive going pulse of the driving signal will be applied through line 94, capacitor 118 and resistor 120 to the gate of SCR 122 triggering it on, which keeps transistor 116 on. The next negative pulse will switch off SCR 122 and turn off transistor 116. The next positive going portion of the pulse appearing at terminal 114 is also applied through resistor 124, 126, diode 127 to charge capacitor 130 which produces a positive voltage in line 72 that is connected to the gate of SCR 56 to trigger it on and thus recycle the call finder module 22. Thus, it should be understood that as long as the driving signal is being generated, the call finder module will continuously search through the circuits and automatically recycle.

The inclusion of capacitor 118, resistor 120 and SCR 122 have been found necessary to insure reliable performance of the recycling operation, since it has been found that the last stage associated with SCR 74 often fails to shut off because of the presence of resistor 99 connected to its cathode. Since no resistor is connected to the cathode of SCR 122 in the power control module, reliable shut off of SCR 74 as well as SCR 122 is assured which thereafter results in positive voltage appearing in line 72 which is necessary for recycling.

To stop or terminate the generation of the driving signal once a circuit has been found which indicates that a dialless telephone has gone off-hook, i.e., voltage is applied at one of the input terminals 30, 32, and 34, a low voltage signal appears in line 46 which is connected to a diode 134 which is in turn connected to the gate of the unijunction transistor 106 thus prohibiting charging of capacitor 112 to a valve that is sufficient to fire unijunction 106 because of a voltage divider effect of resistor 54 (FIG. 5*b*) which is preferably about 68,000 ohms and potentiometer 108 (FIG. 5*e*) in the power control module which is preferably variable up to 1,000,000 ohms.

Once a telephone has been found which has gone off-hook, resulting in a stop driver signal which terminates the generation of the negative pulses and identifies the appropriate telephone number by producing a positive voltage in line 76, 78 and 80 which are connected to the readout driver modules 26, it is also necessary that another positive voltage be applied to the readout driver modules to provide the voltage for illuminating the filaments in the lamps of the visual digital readout unit. As will be more fully explained hereinafter, a positive voltage appearing in line 90 interconnecting the call finder module and the single digit dialing module 28 will result in a positive voltage in line 138 interconnecting the single digit dialing module and the power control module. It is the presence of positive restart voltage in line 138 which causes the resumption of the driving signal to find the existence of other dialless telephones which have gone off-hook and are unanswered. Thus, the telephone numbers will be visually displayed on the digital readout until resumption of the driving signal and when another circuit is found, its telephone number will be displayed until a restart signal is received by the power control module and the driving signal is again resumed. In this manner the numbers of dialless telephones which have gone off-hook and which have not been responded to will be sequentially displayed in the digital readout unit.

The restart driving signal, comprising a voltage in line 138 is applied to the emitter of a unijunction transistor 140 through a potentiometer 142 and a resistor 144, the potentiometer being variable to vary the rate of charge of a capacitor 146 which charges to a potential sufficient to fire the unijunction transistor 140. The values of the components are preferably such that the unijunction will fire within a time period of about one half to about four seconds, and preferably about 1.5 seconds which will determine the length of time that any particular telephone number will be displayed on the readout unit 12. Upon firing the unijunction transistor 140, transistor 148 will be turned off which results in the positive voltage in line 138 being applied through a resistor 150 and diode 152 to the stop driver line 46 enabling the unijunction transistor 106 to resume firing and resume the driving signal.

It has previously been mentioned that once a particular telephone number is displayed in the readout unit, a party at the dial telephone may lift its receiver and freeze the number and, if desired, connect the dial telephone to the dialless telephone having its number being displayed by dialing a single digit. Once the receiver is taken off-hook, the telephone system provides a positive voltage in a register supply bus or line 160 which is connected to the base of a transistor 162 through resistor 164. Since the transistor 162 is connected in parallel with transistor 148, lifting of the receiver of a dial telephone will turn on transistor 162 and shunt transistor 148 thereby effectively precluding the start of the firing of unijunction transistor 106 until the register supply bus 160 again goes low which will enable the switching of transistor 148 to be effective. After the two telephones are connected together the register supply bus 160 will be switched low and the telephone numbers of other unresponded to dialless telephones will be visually sequentially displayed in the digital readout unit while the two telephones are engaged in conversation. Upon the termination of the conversation, the dial telephone is free to respond to other dialless telephones in a similar manner.

Provision is also made for locking the stop driver line in its low voltage condition to preclude restart of the driving signal until the switching circuitry of the telephone system completes the connection of two telephones, typically in approximately 60 milliseconds as is described in the above cross referenced invention of Dahlquist and Medal. Thus, when the register supply line 160 goes high, transistors 166 and 167 are turned on which maintains the stop driver line 46 at low voltage until the register supply line again goes low.

To provide the driving voltage for the readout driver modules 26, the application of positive voltage in line 138 is also effective to turn on transistor 168 in the power control module, which turns on transistor 170. When transistor 170 is placed into conduction, it removes a transistor 172 from saturation which turns on transistors 174 and 176 producing a positive voltage in line 180 which is connected to each of the readout driver modules 26. Thus, the presence of a positive voltage in line 138 will result in a positive voltage in line 180 which will cause the indicator lamps to be illuminated with the identification of the proper integers being provided by the application of voltage in lines 76, 78 and 80 or other similar lines associated with each of the circuits. Since the readout lamps are quite sensitive to overvoltage conditions, in that their life expectancy can be easily substantially shortened overcurrent and overvoltage protection are provided in the power control module 24. To provide overcurrent protection, overcurrent is sensed across resistor 192 and is adjusted by potentiometer 182 to turn on transistor 184. When transistor 184 switches on, it turns on a transistor 186 and the two transistors are interconnected to lock each other on and shut off transistor 174 terminating the positive voltage in line 180. In the event an overvoltage condition exists in line 180, an SCR 190 is turned on which draws current through the small resistor 192 which will open a fuse 194.

To selectively illuminate the filaments in each of the lamps in the digital readout unit, three readout driver modules are provided, although only one of the modules is shown in detail. Referring to FIG. 5*c*, line 180 from the power control module is connected to a series of switching transistors 200–213 which are associated with each of the seven filaments of a lamp and are marked A-G as indicated. Since the readout driver module specifically illustrated is associated with the tens digit of a telephone number, lines such as line 78 from the call finder are also connected to the readout driver module. Referring to FIG. 1 wherein the tens unit has the integer 2 displayed, line 78 is connected to a terminal associated with the integer 2 in the readout driver module. With application of positive voltage in line 180, all transistors 200–213 will be switched on, unless voltage appears in lines such as line 78 which switches off appropriate transistors within the group of transistors 200–213 to preclude illumination of certain filaments. Thus, for example, if the integer 8 is to be displayed, it is necessary that all filaments be illuminated and accordingly all transistors 200–213 will be on. However, assuming that the number 2 is to be displayed and referring to FIG. 5*c*, positive voltage occurring in line 78 will turn on transistor 214 which will turn off transistors 200, 201, 206 and 207 by means of the collector connection of transistor 214 to the bases of transistors 200 and 206. Thus, filaments that will remain illuminated would be filaments E, D, B, A and G which, as can be seen from FIG. 2 will result in the integer 2 being illuminated. It can easily be determined by similarly following the interconnections between other transistors in the lower portion of the FIG. 5*c*, that other filaments will be turned off to indicate the appropriate integer corresponding to the number shown adjacent the lower transistors in the FIG. 5*c*. FIG. 5*d* merely illustrates the nature of the interconnection with the digital display unit with the lines A through G corresponding with the line similarly marked in the readout driver module.

Figure 5A:
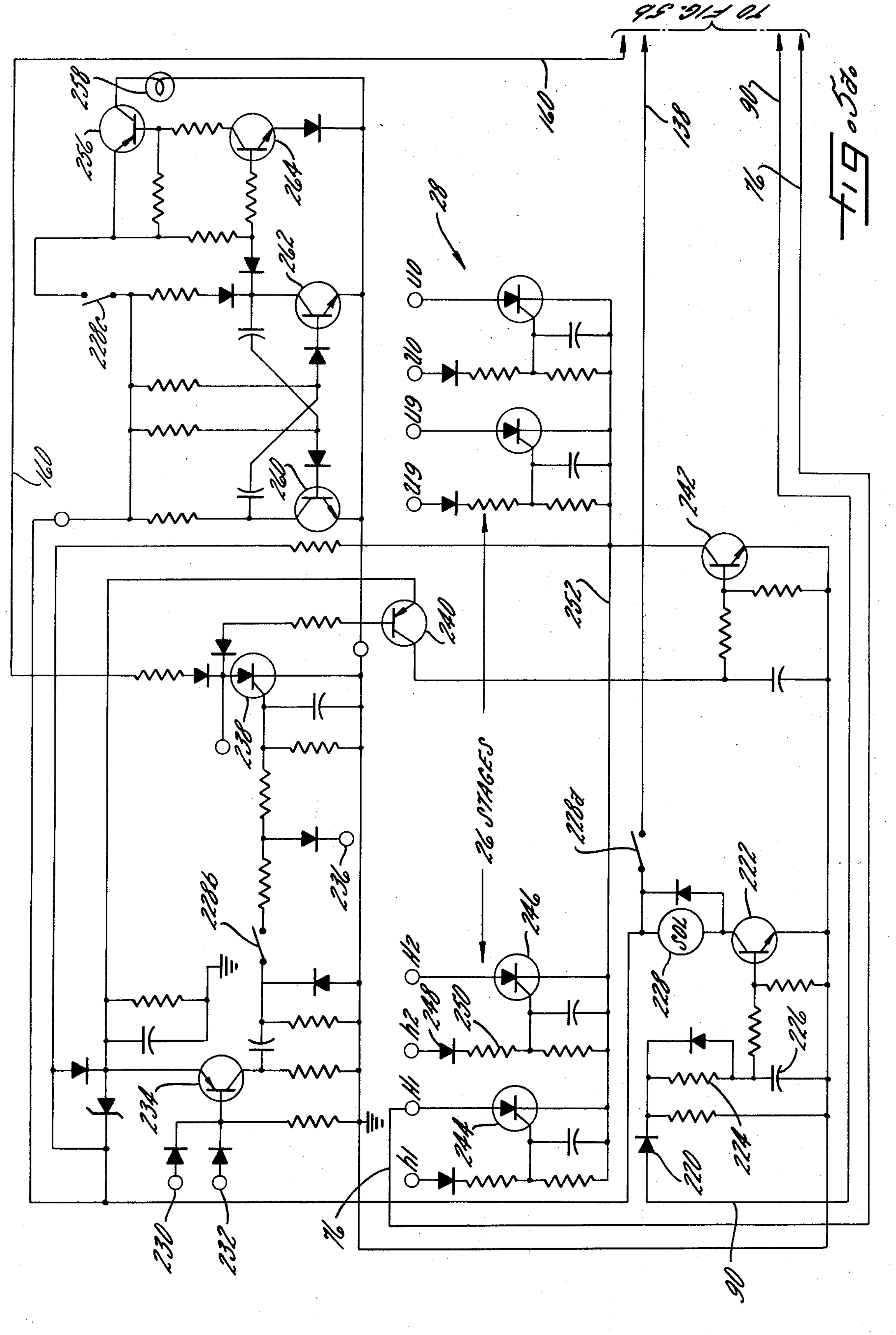
Figure 5B:
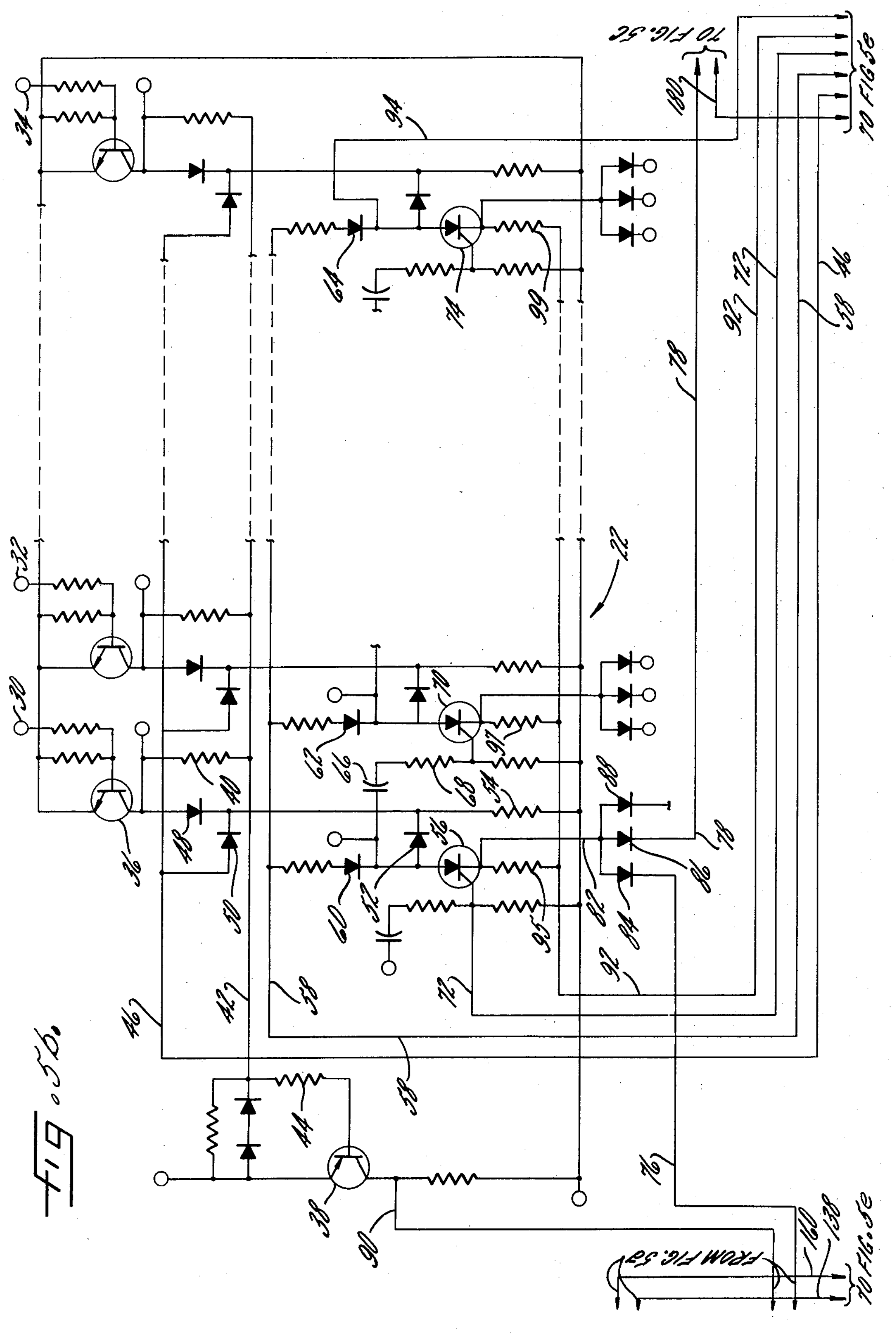
Figure 5C:
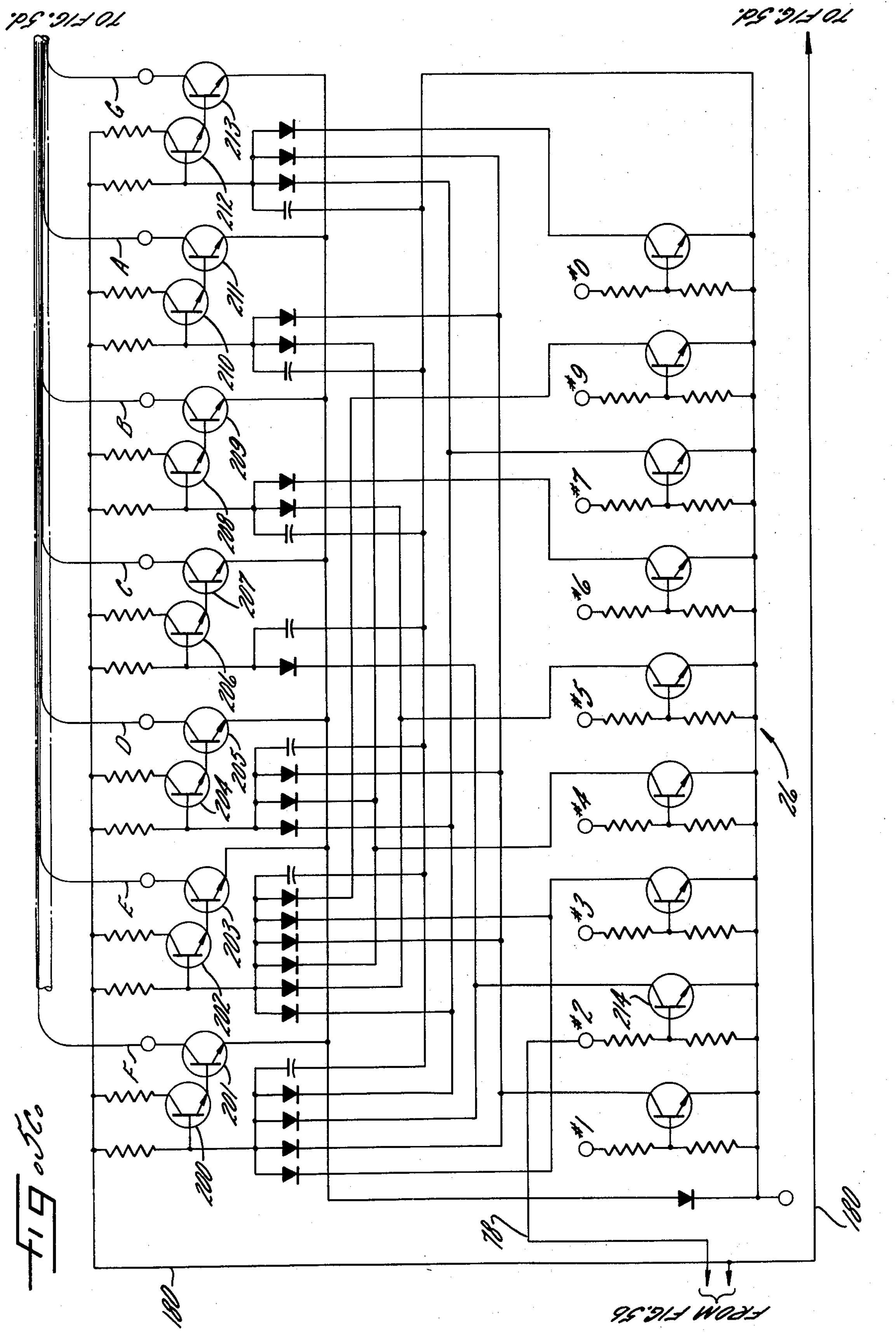
Figure 5D:
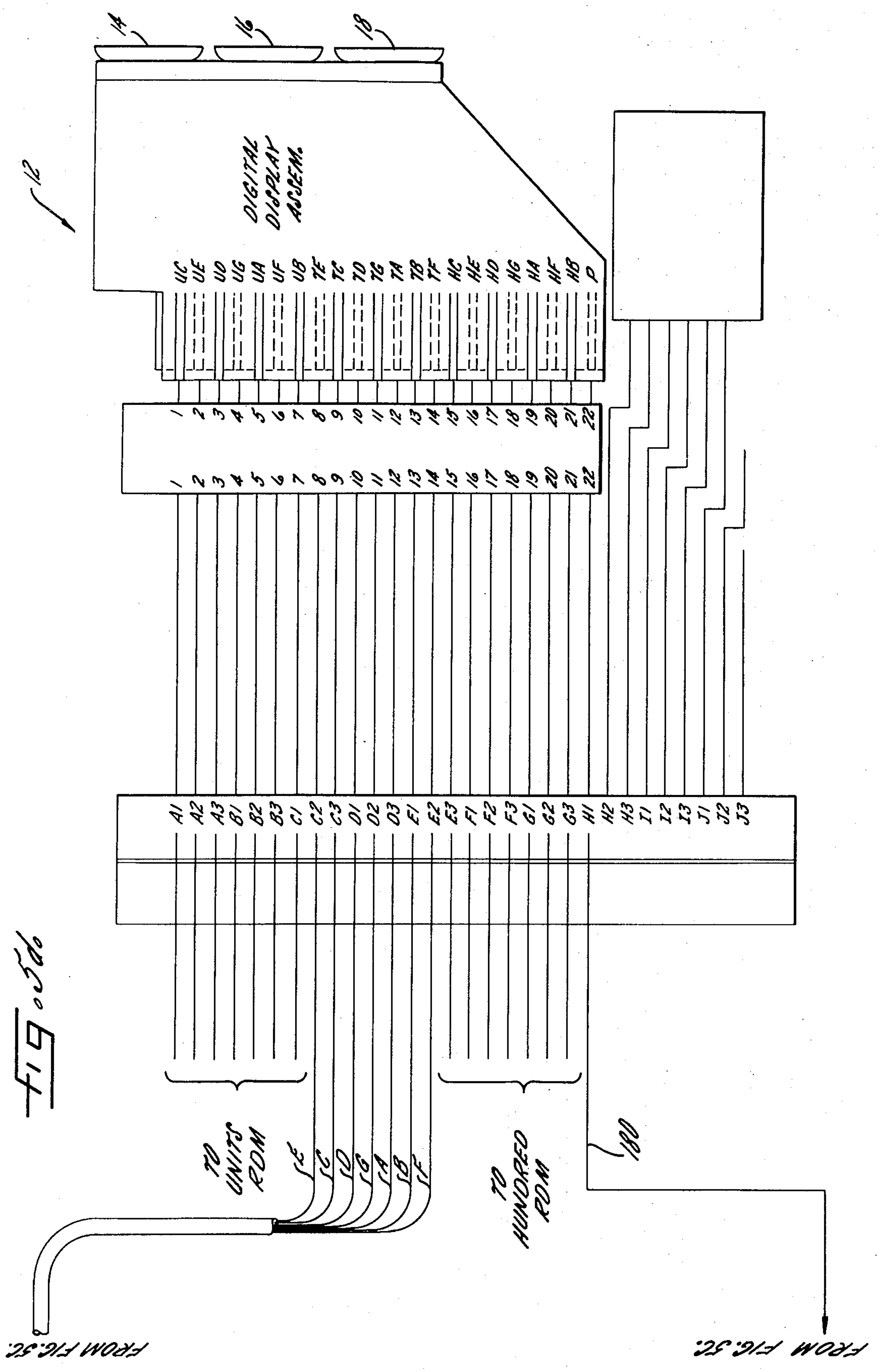
Figure 6:
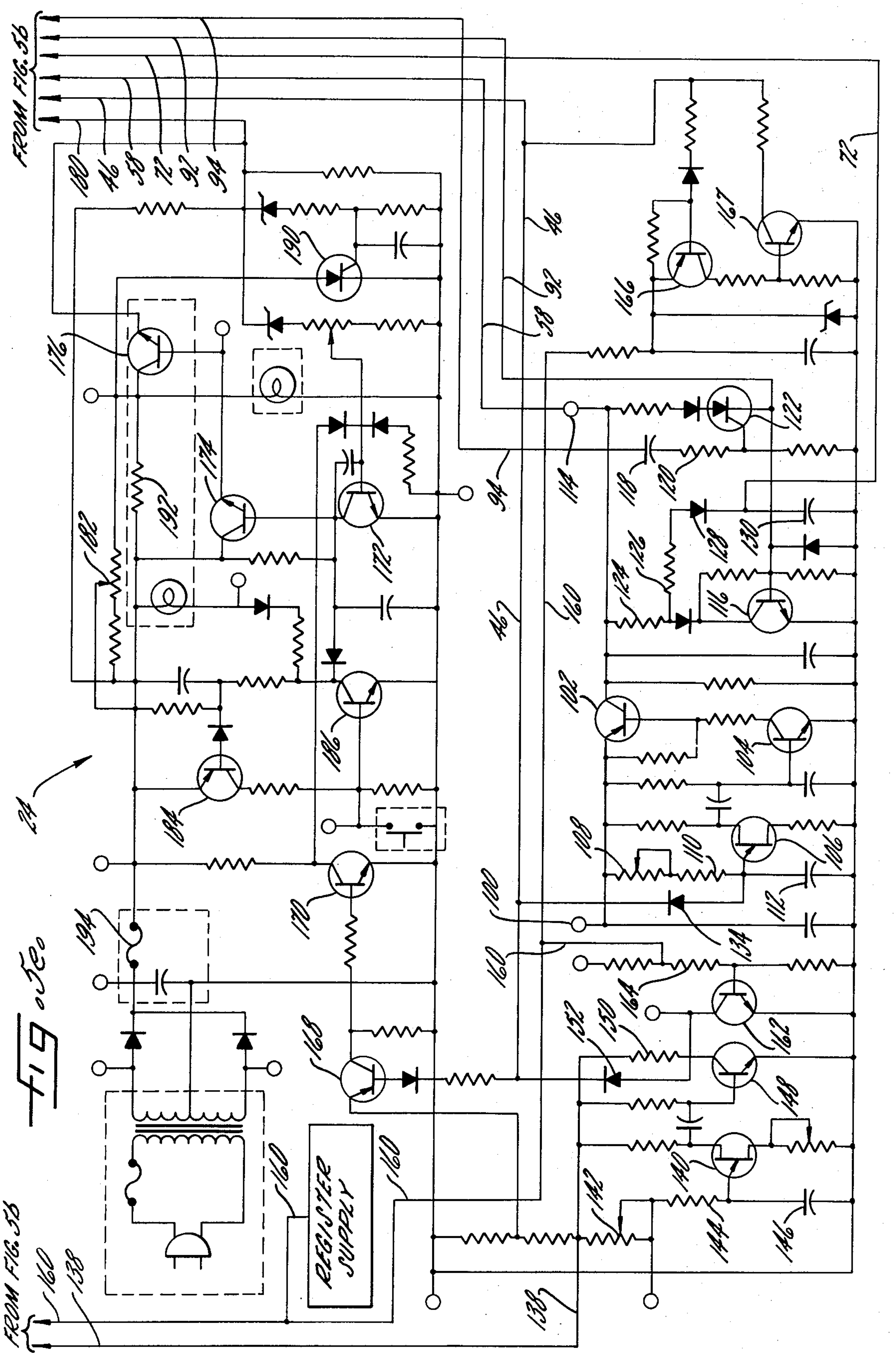

In accordance with an important aspect of the present invention and referring to FIG. 5*a*, the single digit dialing module 28 is adapted to enable a dial telephone to be connected to an unresponded to dialless telephone by depressing a single push button on the telephone, which is preferably one of the unnumbered buttons on a push button dial telephone, such as the asterisk button 216. Once voltage is applied in the call finder module from the annunciator 20, it will be remembered that a positive voltage is produced in line 90 which is effective to enable the single digit dialing module for operation. Thus, a positive voltage in line 90 will be applied through diode 220 to turn on a transistor 222. Because of the resistor 224 and capacitor 226 it is necessary that the voltage be steady state, since the resistor and capacitor provide for a delay in the event the voltage being applied is intermittent as would occur if the annunciator was idicating a busy condition as opposed to an unresponded to dialless telephone which has previously gone off-hook.

When transistor 222 is switched into conduction, a relay 228 is energized, closing contacts 228*a*, 228*b*, and 228*c* all of which are located on FIG. 5*a*. Energization of the relay 228 thus produces a positive voltage in line 138 which initiates the restart of the driving signal produced by the power control module. As previously mentioned, if a dial telephone wishing to respond to the dialless telephone which had previously gone off-hook has its receiver taken off-hook, a positive voltage is applied at the register supply bus 160 which is also applied to the single digit dialing module and provides a positive voltage enabling single digit dialing. A pair of normally high inputs 230 and 232 are connected to the receiver modules of register control equipment of the telephone system and upon depressing of the single predetermined push button, it will provide a low voltage signal in each of the lines corresponding to two separate frequencies, say for example, 941 hertz and 1209 hertz which will turn on transistor 234.

It should be kept in mind that the register control equipment is of conventional design for operating telephones having push button "tone" dialing designed for use with a low voltage system preferably of about 12 volts, and having 30 output wires, with ten wires being associated with the ten digits in each of the units, tens column and the hundreds column. By dialing a three digit number, the register equipment produces a low or ground output signal in one of the lines for each of the units, tens, hundreds column which provides coding information to the system causing it to connect to the appropriate telephone. All of the outputs in the other 27 lines remain at a high 12 volt level.

If the person at the dial telephone does not press the correct button for single digit dialing, which may occur if the person accidentally depresses the wrong button or if another telephone number is intended to be dialed, a low voltage will be produced at terminal 236 which will prohibit single digit dialing. In the event that the correct push button is depressed and the voltage at terminal 236 remains high, and remembering that relay contact 228*b* is closed, then voltage will be applied to the gate of a SCR 238 which will turn it on and thereby turn on transistors 240 and 242.

To accomplish the single digit dialing, a total of 30 SCR's such as SCR's 244 and 246 are provided, the anodes of which are connected by lines (not shown) to the anodes of similar SCR's in the register control module (not shown) which has briefly been hereinbefore described. Thus, the SCR's in the single digit dialing modules are adapted to provide the necessary coding information to the system equally as well as the SCR's in the register control module of the telephone system. It is therefore only necessary to properly identify each of the three digits of a telephone number to be called by switching on the appropriate three SCR's in the single digit dialing module.

To trigger the SCR's, connections are made between the call finder module 22 and the single digit dialing module in a manner similar to the interconnections made between the call finder module and the readout driving module. Thus, line 76 of the call finder module identifying number 2 in the hundreds column also is connected to the gate of SCR 246 through diode 248 and resistor 250. Other interconnections between the single digit dialing module and terminals 78 and 80 of the call finder module corresponding to the tens and units column will provide exact identification of that telephone number such that when positive voltage appears at terminals 76, 78 and 80, the information will be applied to identify the telephone number at the readout driver module as well as in the single digit dialing module. The three SCR's corresponding to the units, tens and hundreds column in the single digit dialing module will not be triggered, however, until the gate voltage exceeds the cathode voltage for each of the three SCR's, and this will not occur until a line 252 interconnecting the cathodes of all of the SCR's and the collector of transistor 242 is switched low. Line 252 is normally at a positive voltage of approximately 12 volts but will be switched low when transistor 242 is switched on which occurs when the relay 228 is energized and the appropriate single digit dialing push button is depressed. Once line 252 goes low, the three predetermined SCR's will be triggered on and provide the necessary coding information to complete the connection between the dial telephone and the dialless telephone to which it is responding.

In accordance with another aspect of the present invention, the single digit dialing feature may be incorporated into the system and may be used by any dial telephone within the system, without the necessity of a digital readout until at that telephone. This may be achieved by providing a telephone with a small lamp that will flash when a dialless telephone is unresponded to after having gone off-hook. Referring to the upper right-hand portion of FIG. 5*a*, the energization of relay 228 closes contacts 228*c* which will turn on transistor 256 in the event its base voltage is low. The collector of transistor 256 is connected to ground through an indicator lamp 258 which is preferably located on one or more of the dial telephones. To provide for flashing of the lamp 258, a multivibrator comprising transistors 260, 262, and the associated circuitry is adapted to switch transistor 264 into and out of conduction which also switches transistor 256 in and out of conduction and thereby provides for flashing of the lamp 258. More specifically, when the transistor 262 is on, transistors 264 and 256 are off. It should be understood that if a dial telephone only has a flashing lamp, the pushing of the appropriate push button for a single digit dialing will result in a connection between that telephone and unresponded to dialless telephone, but the dial telephone would not have the capability of knowing the identity or location of the dialless telephone until the connection is made and would therefore not be able to respond to a number of dialless telephones in any desired order or sequence which can, of course, be done if the dial telephone has a digital readout unit associated with it.

It should be appreciated that the improvements of single digit dialing and digital visual display of the telephone numbers of unresponded to dialless telephones has been shown and described. The improvements are believed to satisfy all of the objects and advantages that have been previously set forth.

We claim as our invention:

1. In a telephone system having a plurality of pushbutton dial and dialless telephones, the combination, comprising:

an individual circuit associated with each of said dialless telephones;

means responsive to one of said dialless telephones going off-hook for initiating a first signal in the individual circuit associated with that particular dialless telephone;

means for producing a driving signal;

means responsive to said driving signal for sequentially searching each of said circuits to detect the presence of said first signal in one or more of said individual circuits;

each of said individual circuits including means responsive to the detection of said first signal therein for producing an output signal identifying such circuit;

said driving signal producing means stopping when said sequential searching means detects the presence of said first signal in one of said individual circuits thereby to cause said last mentioned individual circuit to maintain its identifying output signal, said driving signal producing means automatically restarting within a predetermined time in the absence of a disabling signal to resume said sequential searching;

means for producing a disabling signal for disabling the restart of said drive signal producing means, said disabling signal being produced in response to a pushbutton dial telephone going off-hook; and means responsive to a predetermined signal and said maintained identifying output signal for providing a dial coding information signal for connecting said off-hook pushbutton dial telephone to the dialless telephone associated with the maintained identifying output signal, said predetermined signal being produced by depressing a single pushbutton on said off-hook pushbutton dial telephone, the connection between said pushbutton dial and dialless telephones serving to remove said disabling signal.

2. A telephone system as defined in claim 1, wherein said pushbutton for producing said predetermined signal has no number associated with it.

3. A telephone system as defined in claim 2, including means for disabling said coding information signal producing means in the event a pushbutton associated with a number is initially depressed on said pushbutton dial telephone.

4. A telephone system as defined in claim 1 wherein said dial coding information signal producing means includes means for producing a visual indication on one or more of said pushbutton dial telephones indicating that one or more dialless telephones is unresponded to within the system and that a pushbutton dial telephone can be connected to one of said unresponded to dialless telephones by depressing said single pushbutton on said pushbutton dial telephone.

5. A telephone system as defined in claim 4 wherein said visual indication producing means includes a lamp located on said one or more pushbutton dial telephones, said lamp flashing when one or more of said dialless telephones goes off-hook and is unresponded to.

6. A telephone system as defined in claim 1 wherein said first signal initiated by said means responsive to said dialless telephones going off-hook is a continuous signal, further including means responsive to the detection of said first signal for enabling said dial coding information producing means, and means for pulsing said first signal when the corresponding dialless telephone is off-hook and busy, said pulsing signal being ineffective to enable said dial coding information signal producing means.

7. In a telephone system having a plurality of pushbutton dial and dialless telephones, each of said telephones having a number associated therewith, the combination, comprising:

an individual circuit associated with each of said dialless telephones;

means responsive to one of said dialless telephones going off-hook for initiating a first signal in the individual circuit associated with that particular dialless telephone;

means for sequentially searching all of said circuits to determine the presence of said first signal in one or more of said individual circuits, said sequential searching being performed responsive to receive a driving signal;

means for producing said driving signal, said driving signal producing means stopping when said sequential searching means finds said first signal present in one of said individual circuits, said driving signal producing means automatically restarting within a predetermined time in the absence of a disabling signal;

means for producing a disabling signal for disabling the restart of said driving signal producing means, said disabling signal being produced by a pushbutton dial telephone going off-hook;

each of said individual circuits including means responsive to the detection of said first signal therein for producing an output signal identifying such circuit;

a multifilament lamp display; and means responsive to the output signal identifying one of said dialless telephones for producing a visual indication of the number associated with said identified dialless telephone by selectively illuminating predetermined filaments in said multifilament lamp display.

8. A telephone system as defined in claim 7 wherein said visual indication producing means includes switching means associated with said multifilament lmap display, and means responsive to the stopped condition of said driving signal producing means for producing a display enabling signal for enabling said visual indication switching means, said visual indication switching means being selectively connected to said individual circuits so that the identifying output signal serves to illuminate the predetermined filaments in said lamp to produce the visual indication of the number associated with said identified dialless telephone during the time said enabling signal is produced.

9. A telephone system as defined in claim 8 further including means for removing the display enabling signal in response to an overcurrent or overvoltage condition.

10. A telephone system as defined in claim 8 wherein said switching means for said visual indication producing means includes a semiconductor switching device associated with each of the integers 0 through 7 and 9 of said visual indication producing means, and a plurality of semiconductor switching devices associated with the individual filaments of the lamp, the display enabling signal being coupled to each of the filament associated switching devices, said identifying output signal being selectively coupled to the integer associated switching devices, said integer associated switching devices being selectively coupled in disabling relationship to the filament associated switching devices, whereby said display enabling signal is effective to switch all of said filament associated semiconductor switching devices, unless said identifying output signal switches the semiconductor switching device associated with one of said integers, which prohibits switching of selected filament associated switching devices in said plurality and thereby illuminates only the predetermined filaments identifying said integer.

11. In a telephone system having a plurality of pushbutton dial and dialless telephones, each of said telephones having a number associated therewith, the combination, comprising:

an individual circuit associated with each of said dialless telephones;

means responsive to one of said dialless telephones going off-hook for initiating a first signal in the individual circuit associated with that particular dialless telephone;

means for producing a driving signal;

means responsive to said driving signal for sequentially searching each of said circuits to detect the presence of said first signal in one or more of said individual circuits;

each of said individual circuits including means responsive to the detection of said first signal therein for producing an output signal identifying such circuit;

said driving signal producing means stopping when said sequential searching means detects the presence of said first signal in one of said individual circuits to maintain said identifying output signal said driving signal producing means automatically restarting within a predetermined time in the absence of a disabling signal to resume said sequential searching;

means for producing a disabling signal for disabling the restart of said drive signal producing means, said disabling signal being produced by a pushbutton dial telephone going off-hook;

a multifilament lamp display;

means responsive to said maintained identifying output signal for producing a visual indication of the number associated with said identified dialless telephone by selectively illuminating predetermined filaments in said multifilament lamp display; and means for providing a dial coding information signal for connecting said off-hook pushbutton dial telephone to the dialless telephone associated with the maintained identifying output signal, said coding information signal produced in response to said maintained identifying output signal and a predetermined signal, said predetermined signal being produced by depressing a single predetermined pushbutton on said off-hook pushbutton dial telephone.

12. A telephone system as defined in claim 11, wherein said pushbutton for producing said predetermined signal has no number associated with it.

13. A telephone system as defined in claim 12, including means for disabling said coding information signal producing means in the event a pushbutton associated with a number is initially depressed on said pushbutton dial telephone.

14. A telephone system as defined in claim 11 wherein said dial coding information signal producing means includes means for producing a visual indication in a single filament lamp on one or more of said pushbutton dial telephones indicating that one or more dialless telephones is unresponded to within the system and that a pushbutton dial telephone can be connected to one of said unresponded to dialless telephones by depressing said single predetermined pushbutton on said off-hook pushbutton dial telephone.

15. A telephone system as defined in claim 11 wherein said first signal initiated by said means responsive to said dialless telephones going off-hook is a continuous signal, further including means responsive to the detection of said first signal for enabling said dial coding information producing means, and means for pulsing said first signal when the corresponding dialless telephone is off-hook and busy, said pulsing signal being ineffective to enable said dial coding information signal producing means.

16. A telephone system as defined in claim 11 wherein said visual indication producing means includes a switching means associated with said multifilament display, and means responsive to the stopped condition of said driving signal producing means for producing a display enabling signal for enabling said visual indication switching means, said visual indication switching means being selectively connected to said individual circuits so that said maintained identifying output signal serves to illuminate the predetermined filaments in said lamp to produce the visual indication of the number associated with said identified dialless telephone during the time such enabling signal is produced.

* * * * *